US010053061B2

(12) United States Patent
Pennala et al.

(10) Patent No.: US 10,053,061 B2
(45) Date of Patent: Aug. 21, 2018

(54) BRAKE PEDAL EMULATOR OF A BRAKE-BY-WIRE SYSTEM FOR A VEHICLE

(71) Applicant: GM GLOBAL TECHNOLOGY OPERATIONS LLC, Detroit, MI (US)

(72) Inventors: Brandon C. Pennala, Milford, MI (US); Christopher A. Hammond, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/250,041

(22) Filed: Aug. 29, 2016

(65) Prior Publication Data

US 2018/0056949 A1    Mar. 1, 2018

(51) Int. Cl.
*B60T 7/04* (2006.01)
*G05G 1/30* (2008.04)
*B60T 7/06* (2006.01)

(52) U.S. Cl.
CPC ............... *B60T 7/06* (2013.01); *B60T 7/042* (2013.01); *G05G 1/30* (2013.01)

(58) Field of Classification Search
CPC ... B60T 7/04; B60T 7/042; B60T 7/06; B60K 26/021; B60K 2026/022; B60K 2026/023; G05G 1/30; G05G 1/44; G05G 1/445; G05G 1/46; G05G 5/03; G01L 5/225
See application file for complete search history.

(56) References Cited

U.S. PATENT DOCUMENTS

| 3,398,817 | A | * | 8/1968 | Shinga | B60K 26/02 477/193 |
| 5,138,899 | A | * | 8/1992 | Katagiri | B60T 7/06 188/77 W |
| 6,047,679 | A | * | 4/2000 | Matsumoto | F02D 11/107 123/396 |
| 6,164,155 | A | * | 12/2000 | Tonissen | G05G 1/30 74/514 |
| 7,082,853 | B2 | * | 8/2006 | Fujiwara | B60T 7/042 74/512 |
| 7,770,491 | B2 | * | 8/2010 | Ritter | B60K 26/021 74/560 |
| 8,836,493 | B2 | * | 9/2014 | Thiel | B60K 26/021 303/152 |
| 9,229,469 | B2 | * | 1/2016 | Maruyama | G05G 1/30 |
| 9,870,020 | B2 | * | 1/2018 | Klestil | G05G 5/03 |
| 2013/0091977 | A1 | * | 4/2013 | Fukushima | B60K 26/021 74/513 |
| 2016/0121869 | A1 | * | 5/2016 | Cann | B60T 13/746 188/156 |

FOREIGN PATENT DOCUMENTS

| DE | 102011054655 A1 * | 4/2013 | ............. G05G 5/03 |
| DE | 102011088998 A1 * | 6/2013 | ........... B60K 26/021 |
| DE | 102012202313 A1 * | 8/2013 | ............. G05G 1/44 |

(Continued)

*Primary Examiner* — Adam D Rogers
(74) *Attorney, Agent, or Firm* — Cantor Colburn LLP

(57) ABSTRACT

A brake pedal emulator extends and connects between a support structure and a brake pedal pivotally engaged to the support structure at an axis. The brake pedal emulator includes a rotational damping device operatively connected to the brake pedal for driven rotation as the brake pedal moves about the axis.

11 Claims, 3 Drawing Sheets

(56) References Cited

FOREIGN PATENT DOCUMENTS

| DE | 102012112514 A1 | * | 6/2014 | ............. | B60K 26/02 |
|----|-----------------|---|--------|---------------|------------|
| DE | 102015214490 A1 | * | 2/2017 | ............. | B60K 26/02 |
| FR | 2846759 A1 | * | 5/2004 | ........... | B60K 26/021 |
| JP | 02067435 A | * | 3/1990 | | |
| WO | WO-2014117965 A1 | * | 8/2014 | ............... | G05G 1/44 |
| WO | WO-2016140262 A1 | * | 9/2016 | ............. | B60K 26/02 |

* cited by examiner

BRAKE PEDAL EMULATOR OF A BRAKE-BY-WIRE SYSTEM FOR A VEHICLE

FIELD OF THE INVENTION

The subject invention relates to a brake-by-wire (BBW) system, and more particularly, to a brake pedal emulator of the BBW system and method of operation.

BACKGROUND

Traditional service braking systems of a vehicle are typically hydraulic fluid based systems actuated by a driver depressing a brake pedal that generally actuates a master cylinder. In-turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually actuated master cylinder with supplemental actuation pressure gradients supplied by the hydraulic modulator assembly during anti-lock, traction control, and stability enhancement modes of operation.

When a plunger of the master cylinder is depressed by the brake pedal to actuate the wheel brakes, pedal resistance is encountered by the driver. This resistance may be due to a combination of actual braking forces at the wheels, hydraulic fluid pressure, mechanical resistance within the booster/master cylinder, the force of a return spring acting on the brake pedal, and other factors. Consequently, a driver is accustomed to and expects to feel this resistance as a normal occurrence during operation of the vehicle. Unfortunately, the 'feel' of conventional brake pedals are not adjustable to meet the desires of a driver.

More recent advancements in braking systems include BBW systems that actuate the vehicle brakes via an electric signal typically generated by an on-board controller. A braking force or torque may be applied to the wheel brakes without a direct hydraulic link to the brake pedal. The BBW system may be an add-on, (i.e., and/or replace a portion of the more conventional hydraulic brake systems), or may completely replace the hydraulic brake system (i.e., a pure BBW system). In either type of BBW system, the brake pedal 'feel', which a driver is accustomed to, must be emulated.

Accordingly, it is desirable to provide a brake pedal emulator that may be adjustable and may simulate the brake pedal 'feel' of more conventional brake systems.

SUMMARY OF THE INVENTION

In one exemplary embodiment of the invention, a brake pedal emulator extends and connects between a support structure and a brake pedal pivotally engaged to the support structure at an axis. The brake pedal emulator includes a rotational damping device operatively connected to the brake pedal for driven rotation as the brake pedal moves about the axis.

In another exemplary embodiment of the invention, a BBW system for a vehicle includes a brake pedal and a damping device. The brake pedal is pivotally engaged to a support structure about a first axis, and the damping device is rotationally driven by the brake pedal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
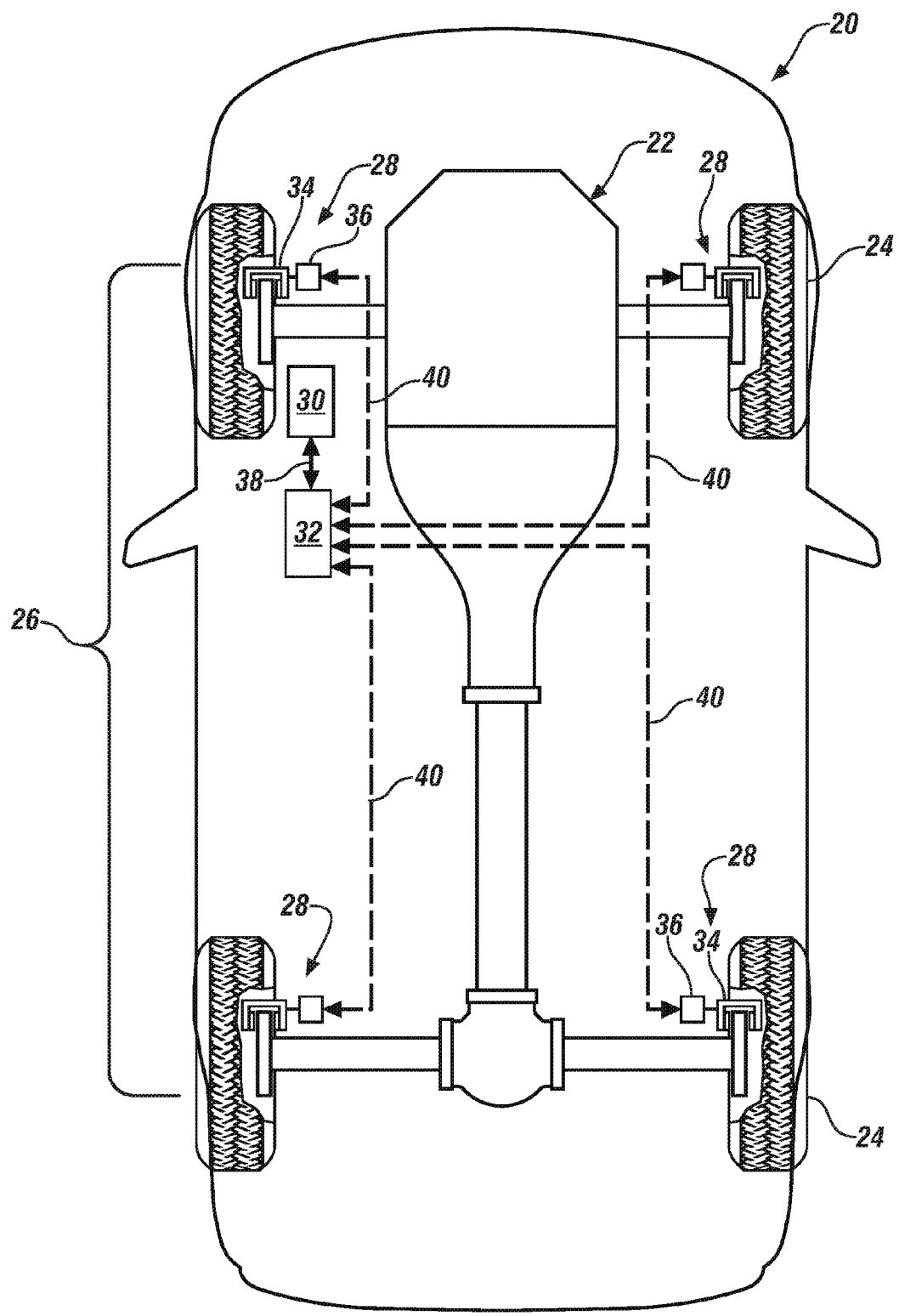
FIG. 1 is a schematic plan view of a vehicle having a BBW system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention, FIG. 1 is a schematic of a vehicle 20 that may include a powertrain 22 (i.e., an engine, transmission and differential), a plurality of rotating wheels 24 (i.e., four illustrated), and a BBW system 26 that may include a brake assembly 28 for each respective wheel 24, a brake pedal assembly 30, and a controller 32. The powertrain 22 is adapted to drive at least one of the wheels 24 thereby propelling the vehicle 20 upon a surface (e.g., road). The BBW system 26 is configured to generally slow the speed and/or stop motion of the vehicle 20. The vehicle 20 may be an automobile, truck, van, sport utility vehicle, or any other self-propelled or towed conveyance suitable for transporting a burden.

Each brake assembly 28 of the BBW system 26 may include a brake 34 and an actuator 36 configured to operate the brake. The brake 34 may include a caliper and may be any type of brake including disc brakes, drum brakes, and others. As non-limiting examples, the actuator 36 may be an electro-hydraulic brake actuator (EHBA) or other actuator capable of actuating the brake 34 based on an electrical input signal that may be received from the controller 32. More specifically, the actuator 36 may be or include any type of motor capable of acting upon a received electric signal and as a consequence converting energy into motion that controls movement of the brake 34. Thus, the actuator 36 may be a direct current motor configured to generate electro-hydraulic pressure delivered to, for example, the calipers of the brake 34.

The controller 32 may include a computer-based processor (e.g., microprocessor) and a computer readable and writeable storage medium. In operation, the controller 32 may receive one or more electrical signals from the brake pedal assembly 30 over a pathway (see arrow 38) indicative of driver braking intent. In-turn, the controller 32 may process such signals, and based at least in-part on those signals, output an electrical command signal to the actuators 36 over a pathway (see arrow 40). Based on any variety of vehicle conditions, the command signals directed to each wheel 24 may be the same or may be distinct signals for each wheel 24. The pathways 38, 40 may be wired pathways, wireless pathways, or a combination of both. Non-limiting examples of the controller 32 may include an arithmetic logic unit that performs arithmetic and logical operations; an electronic control unit that extracts, decodes, and executes instructions from a memory; and, an array unit that utilizes multiple parallel computing elements. Other examples of the controller 32 may include an engine control module, and an application specific integrated circuit. It is further contemplated and understood that the controller 32 may include redundant controllers, and/or the system may include other redundancies, to improve reliability of the BBW system 26.

Figure 2:
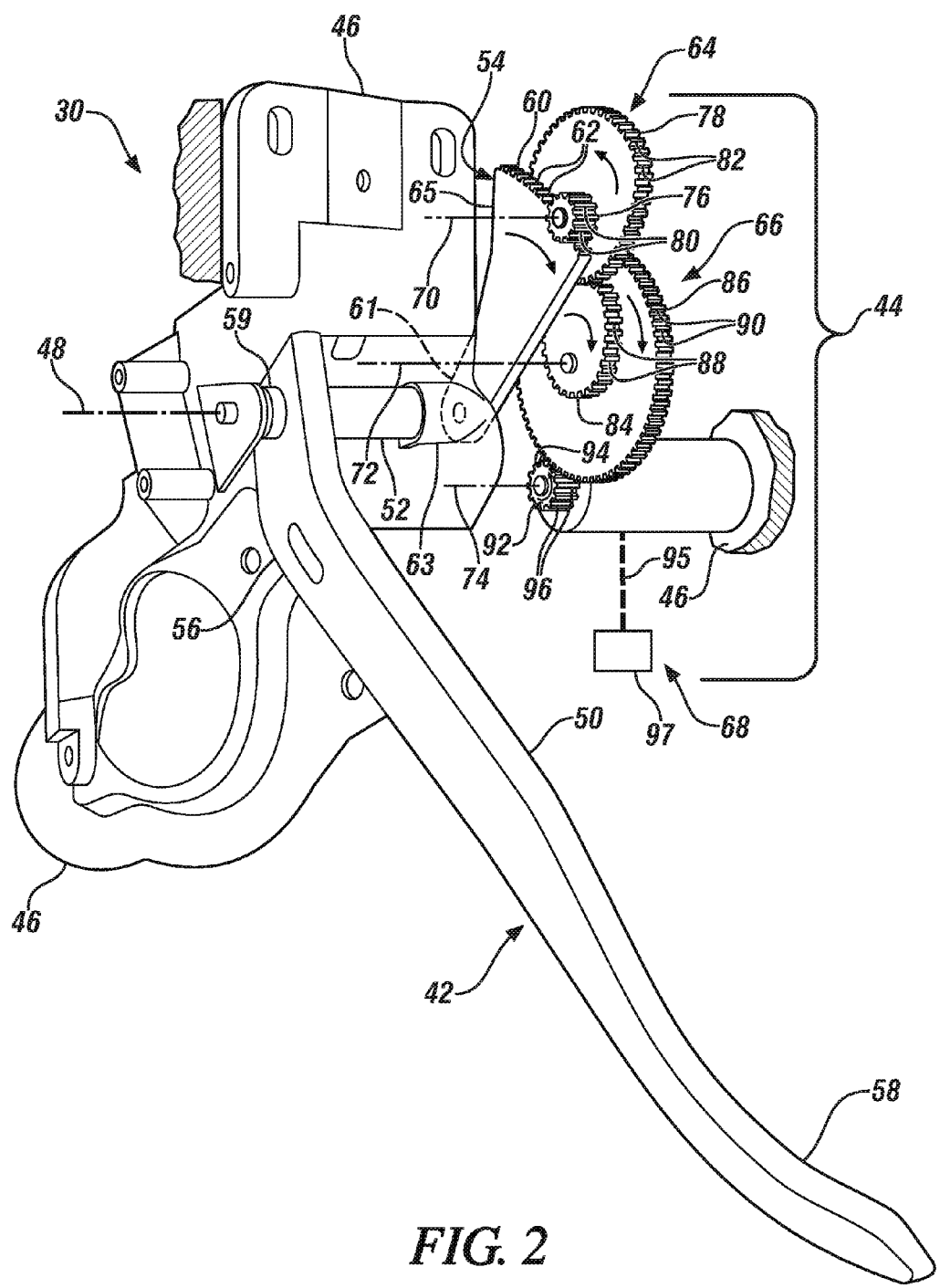
FIG. 2 is a perspective view of a brake pedal assembly of the BBW system.

Referring to FIG. 2, the brake pedal assembly 30 may include a brake pedal 42 and a brake pedal emulator 44. The brake pedal 42 may be supported by, and in moving relationship too, a fixed structure 46. Illustrated as one non-limiting example, the brake pedal 42 may be pivotally engaged to the fixed structure 46 about a pivot axis 48. The emulator 44 may be generally supported by the fixed structure 46, extends between the brake pedal 42 and the fixed structure 46, and is rotationally driven by the brake pedal 42.

The brake pedal 42 may include an elongated arm 50, a spacer or stanchion 52, and a geared member 54 rigidly engaged with one-another. The elongated arm 50 includes an end portion 56 pivotally engaged to the structure 46 at the pivot axis 48 and an opposite end portion 58 that may support a foot pad (not shown) for driver actuation of the brake pedal 42. An first end segment 59 of the spacer 52 may be rigidly engaged to, and may project in a substantially normal direction outwardly from, the end portion 56 of the elongated arm 50. An end segment 61 of the geared member 54 may project radially outward from an opposite end segment 63 of the spacer 52. An opposite end segment 65 of the geared member 54 may carry an arcuate surface 60 that extends at least partially circumferentially about axis 48, and faces substantially radially outward. The arcuate surface 60 may be substantially cylindrical and may define a plurality of teeth 62 for rotational engagement with the emulator 44.

The emulator 44 of the brake pedal assembly 30 is configured to simulate the behavior and/or 'feel' of a more traditional hydraulic braking system, and may include a member 64, a member 66, and a damping device 68 that may be rotational. The member 64 is rotationally driven about an axis 70 by the geared member 54. The member 66 is rotationally driven about an axis 72 by the member 64, and the damping device 68 may be rotationally driven about an axis 74 by the member 66. The members 64, 66 may be rotationally supported by the structure 46, and a housing (not shown) of the damping device 68 may be engaged to and supported by the structure 46.

The member 64 may include an arcuate surface 76 and an arcuate surface 78 that may be axially offset from the arcuate surface 76 with respect to axis 70. The arcuate surface 76 extends, at least in-part, circumferentially about the axis 70, may be cylindrical, and may face substantially radially outward. A plurality of teeth 80 defined, or carried by, the arcuate surface 76 are operatively engaged to the plurality of teeth 62 of surface 60. The arcuate surface 78 extends at least in-part circumferentially about the axis 70, may be non-cylindrical (e.g., lobed-shaped), and may face substantially radially outward. A plurality of teeth 82 defined or carried by the arcuate surface 78 are positioned for operative engagement to the member 66.

The member 66 may include an arcuate surface 84 and an arcuate surface 86 that may be axially offset from the arcuate surface 84 with respect to axis 72. The arcuate surface 84 extends at least in-part circumferentially about the axis 72, may be non-cylindrical (e.g., lobed-shaped), and may face substantially radially outward. A plurality of teeth 88, defined or carried by the arcuate surface 84, are operatively engaged to the plurality of teeth 82 of the arcuate surface 78. The arcuate surface 86 extends at least in-part circumferentially about the axis 72, may be substantially cylindrical, and may face substantially radially outward. A plurality of teeth 90, defined or carried by the arcuate surface 86, are positioned for operative engagement to the damping device 68.

The damping device 68 may be an electric motor that may be shorted (i.e., passive functionality). More particularly, motor leads 95 may be electrically connected to a tuned resistor 97 such that adjusting the resistance of the resistor may change the motor torque (i.e., resistive torque and hence damping force) at a given motor speed. The shorted motor 68 may include a motor shaft 92 positioned for rotation about the axis 74. The shaft 92 includes an arcuate surface 94 that extends, at least in-part, circumferentially about the axis 74, may be substantially cylindrical, and may face substantially radially outward. A plurality of teeth 96, defined or carried by the arcuate surface 94, are positioned for operative engagement to the teeth 90 of the arcuate surface 86.

Figure 3:
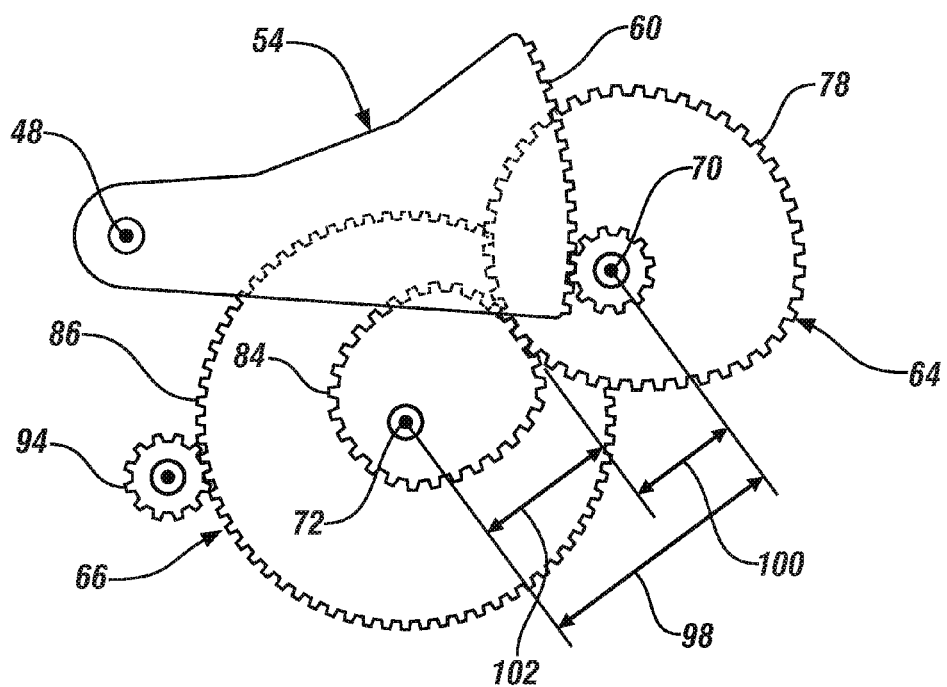
FIG. 3 is a partial side view of an emulator of the brake pedal assembly.

Referring to FIG. 3, the emulator 44 includes a distance (see arrow 98) measured between the axis 70 associated with the member 64 and the axis 72 associated with the member 66. The distance 98 may be fixed and may be substantially equal to the summation of a radius (see arrow 100) of the arcuate surface 78 and a radius (see arrow 102) of the arcuate surface 84. The radii 100, 102 are measured from the respective axes 70, 72 to the circumferential location where the respective surfaces 78, 84 mesh. Unlike the distance 98, the radii 100, 102 are not fixed because the surfaces 78, 84 may not be cylindrical. Therefore, and in one example, as the members 64, 66 rotate, the radius 100 may decrease and the radius 102 increases so that the summation of the radii equals about the distance 98.

Figure 4:
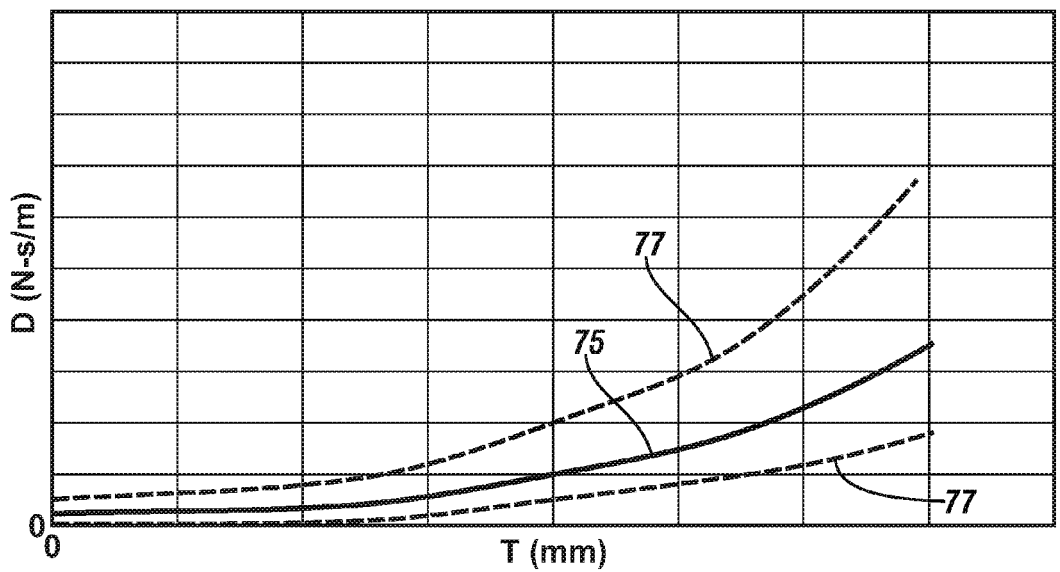
FIG. 4. is a graph of a damping coefficient profile of the BBW system.

Referring to FIG. 4, one example of a damping coefficient profile is generally illustrated as a function of brake pedal travel T, illustrated in the graph as a damping coefficient D versus the brake pedal travel T. The solid arcuate or curved line 75 represents the targeted profile, and the dashed lines 77 represent the outer bounds (i.e., tolerance) of the targeted profile. In operation, the emulator 44 generally functions along the damping coefficient profile 75 as the brake pedal 43 is displaced (e.g., pivoted) by a driver. The profile 75 may be modeled after a more traditional braking system to simulate a desired brake pedal 'feel'. The associated progressive pedal damping effect may be integrated into the BBW system 26. The shaped surfaces 78, 84 (e.g., gear set) are used to control or establish a desired pedal-to damping device speed ratio as a function of pedal travel. That is, the shaped gear set is used to modify the damping coefficient as a function of pedal position. It is further noted that the damping coefficient D is a function of pedal position, and the damping force is a function of pedal apply rate and pedal position.

Advantages and benefits of the present disclosure include highly adjustable pedal damping characteristics that require no electric power consumption, and instead, may utilize a motor that functions as a generator. Other advantages may include a simulated brake pedal stiffness, damping and hysteresis similar to that of a vacuum boosted system. Yet another advantage includes a damping device that not only controls the magnitude of a damping force as a function of pedal speed, but may also control the damping force (i.e., damping coefficient) as a function of brake pedal travel to match a desired damping coefficient curve.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A brake pedal emulator extending and connected between a support structure and a brake pedal pivotally engaged to the support structure at a first axis, the brake pedal emulator comprising:
    a rotational damping device operatively connected to the brake pedal, and wherein the rotational damping device is constructed and arranged to rotate as the brake pedal moves about the first axis, and the rotational damping device being a shorted electric motor.

2. The brake pedal emulator set forth in claim 1, wherein the electric motor includes a tuned resistor for setting a motor torque at a given motor speed.

3. A brake pedal emulator extending and connected between a support structure and a brake pedal pivotally engaged to the support structure at a first axis, the brake pedal emulator comprising:
    a rotational damping device operatively connected to the brake pedal, and wherein the rotational damping device is constructed and arranged to rotate as the brake pedal moves about the first axis;
    a first arcuate surface being part of and directly carried by the brake pedal and extending circumferentially about the first axis, the first arcuate surface defining a plurality of first teeth;
    a second arcuate surface extending circumferentially about a second axis, the second arcuate surface defining a plurality of second teeth operatively engaged to the plurality of first teeth for rotation of the second arcuate surface, wherein the second arcuate surface is located between the first arcuate surface and the rotational damping device; and
    a first member constructed and arranged for rotation about the second axis, the first member including the second arcuate surface and a non-cylindrical third arcuate surface extending circumferentially about the second axis and defining a plurality of third teeth; and wherein the second arcuate surface is cylindrical and the third arcuate surface is operatively located between the second arcuate surface and the rotational damping device.

4. The brake pedal emulator set forth in claim 3 further comprising:
    a fourth arcuate surface extending circumferentially about a third axis, the fourth arcuate surface defining a plurality of fourth teeth operatively engaged to the plurality of third teeth for rotation of the fourth arcuate surface, and wherein the fourth arcuate surface is operatively located between the third arcuate surface and the rotational damping device.

5. The brake pedal emulator set forth in claim 4 further comprising:
    a second member constructed and arranged for rotation about the third axis, the second member including the fourth arcuate surface and a fifth arcuate surface extending circumferentially about the third axis and defining a plurality of fifth teeth; and wherein the fourth arcuate surface is non-cylindrical and the fifth arcuate surface is operatively located between the fourth arcuate surface and the rotational damping device.

6. The brake pedal emulator set forth in claim 5, wherein the fifth arcuate surface is cylindrical.

7. The brake pedal emulator set forth in claim 6, wherein the rotational damping device includes a shaft constructed and arranged to rotate about a fourth axis, the shaft including a sixth arcuate surface defining a plurality of sixth teeth operatively engaged to the plurality of fifth teeth for rotation of the sixth arcuate surface.

8. The brake pedal emulator set forth in claim 7, wherein the first, second, third and fourth axis are substantially parallel to one-another.

9. The brake pedal emulator set forth in claim 7, wherein the sixth arcuate surface is driven by the second member.

10. The brake pedal emulator set forth in claim 7, wherein the third arcuate surface and the fourth arcuate surface are non-cylindrical and the location of the second and third axes are fixed.

11. A brake-by-wire system for a vehicle comprising:
    a brake pedal pivotally engaged to a support structure about a first axis;
    a damping device rotationally driven by the brake pedal;
    a first member rotationally driven by the brake pedal; and
    a second member rotationally driven by the first member, and constructed and arranged to rotationally drive the damping device, wherein the first member includes a non-cylindrical, arcuate, surface operatively meshed to a non-cylindrical, arcuate, surface of the second member, wherein the damping device is a shorted electrical motor.

* * * * *